US011057664B1

(12) United States Patent
Dodge et al.

(10) Patent No.: US 11,057,664 B1
(45) Date of Patent: Jul. 6, 2021

(54) LEARNING MULTI-DEVICE CONTROLLER WITH PERSONALIZED VOICE CONTROL

(71) Applicant: Amazon Technologies, Inc., Seattle, WA (US)

(72) Inventors: Michael L S Dodge, Seattle, WA (US); Charles Shearer Dorner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/561,503

(22) Filed: Sep. 5, 2019

Related U.S. Application Data

(62) Division of application No. 15/368,438, filed on Dec. 2, 2016, now Pat. No. 10,469,787.

(51) Int. Cl.
  *H04N 5/44* (2011.01)
  *H04N 21/422* (2011.01)
  *H04N 21/45* (2011.01)

(52) U.S. Cl.
  CPC .. *H04N 21/42204* (2013.01); *H04N 21/42206* (2013.01); *H04N 21/42221* (2013.01); *H04N 21/4532* (2013.01)

(58) Field of Classification Search
  CPC ......... H04N 5/4403; H04N 2005/4426; H04N 2005/4432; H04N 21/42204
  USPC .................. 348/734, 552, 14.05, 14.04, 114; 340/815.6, 426.13, 426.14; 725/80, 81
  See application file for complete search history.

(56) References Cited

U.S. PATENT DOCUMENTS

| 5,158,181 | A | 10/1992 | Bailey |
|---|---|---|---|
| 6,219,645 | B1 | 4/2001 | Byers |
| 7,969,514 | B2 | 6/2011 | Haughawout et al. |
| 7,973,648 | B2 | 7/2011 | Kawakita |
| 8,098,337 | B2 | 1/2012 | Martch |
| 8,502,925 | B2 | 8/2013 | McRae et al. |
| 9,754,480 | B2 * | 9/2017 | Arling .............. H04N 21/42226 |
| 2001/0041982 | A1 | 11/2001 | Kawasaki et al. |
| 2003/0189509 | A1 | 10/2003 | Hayes et al. |
| 2010/0278377 | A1 | 11/2010 | Hamel et al. |
| 2010/0329688 | A1 | 12/2010 | Young |
| 2011/0283338 | A1 | 11/2011 | Yang et al. |

(Continued)

OTHER PUBLICATIONS

U.S. Appl. No. 15/368,438, "Final Office Action", dated Aug. 2, 2018, 8 pages.

(Continued)

*Primary Examiner* — John W Miller
*Assistant Examiner* — Jean W Desir
(74) *Attorney, Agent, or Firm* — Kilpatrick Townsend & Stockton LLP

(57) ABSTRACT

Techniques for providing instruction to devices in the network are provided. For example, based at least in part on the list of currently active devices and the command, a controller can determine a sequence of IR signals associated with at least one currently active device and transmit, utilizing an IR transmitter incorporated with the controller, the sequence of IR signals to one or more of the currently active devices. In another example, an audio command and location information can be received and used to determine where a controller should transmit an IR signal that corresponds with the audio command, based at least in part on the location information.

20 Claims, 10 Drawing Sheets

(56) References Cited

U.S. PATENT DOCUMENTS

| | | |
|---|---|---|
| 2012/0051589 A1 | 3/2012 | Schloegel et al. |
| 2014/0079223 A1 | 3/2014 | Nguyen et al. |
| 2014/0222436 A1 | 8/2014 | Binder et al. |
| 2016/0316293 A1 | 10/2016 | Klimanis |
| 2017/0017928 A1 | 1/2017 | Miller et al. |
| 2017/0041524 A1 | 2/2017 | Schoenen et al. |

OTHER PUBLICATIONS

U.S. Appl. No. 15/368,438, "Non-Final Office Action", dated Feb. 8, 2018, 10 pages.
U.S. Appl. No. 15/368,438, "Non-Final Office Action", dated Feb. 5, 2019, 8 pages.
U.S. Appl. No. 15/368,438, "Notice of Allowance", dated Jul. 1, 2019, 7 pages.
U.S. Appl. No. 15/368,438, "Restriction Requirement", dated Nov. 3, 2017, 7 pages.
U.S. Appl. No. 15/368,482, "Personalizing the Learning Home Multi-Device Controller," filed Dec. 2, 2016.
U.S. Appl. No. 15/368,496, "Curating Audio and IR Commands Through Machine Learning," filed Dec. 2, 2016.
U.S. Appl. No. 16/289,604, "Curating Audio and IR Commands Through Machine Learning," filed Feb. 28, 2019.
Kellogg et al., "Bringing Gesture Recognition to All Devices", Proceeding NSDI'14: Proceedings of the 11th USENIX Conference on Networked Systems Design and Implementation, Apr. 2-4, 2014, pp. 303-316.

\* cited by examiner

LEARNING MULTI-DEVICE CONTROLLER WITH PERSONALIZED VOICE CONTROL

CROSS-REFERENCE TO RELATED APPLICATIONS

This application is a Divisional of U.S. patent application Ser. No. 15/368,438, filed Dec. 2, 2016, issued as U.S. Pat. No. 10,469,787 on Nov. 5, 2019, and entitled "LEARNING MULTI-DEVICE CONTROLLER WITH PERSONALIZED VOICE CONTROL," which is related to U.S. patent application Ser. No. 15/368,482, filed Dec. 2, 2016, issued as U.S. Pat. No. 10,375,340 on Aug. 6, 2019, and entitled "PERSONALIZING THE LEARNING HOME MULTI-DEVICE CONTROLLER," and U.S. patent application Ser. No. 15/368,496, filed Dec. 2, 2016, issued as U.S. Pat. No. 10,268,447 on Apr. 23, 2019, and entitled "CURATING AUDIO AND IR COMMANDS THROUGH MACHINE LEARNING," the full disclosures of which are incorporated herein by reference for all purposes.

BACKGROUND

As more devices are added to home communication networks, managing these devices becomes more complicated. For example, there may be several electronic devices in a living room, including a television, cable box, and audio amplifier for audio. Users would use individual remotes to control each device, or wade through a complicated setup process for setting up a universal remote. Sometimes, the device is not recognized by the pre-printed universal remote catalog, especially when the device is newer than the universal remote control.

BRIEF DESCRIPTION OF THE DRAWINGS

Various embodiments in accordance with the present disclosure will be described with reference to the drawings, in which.

DETAILED DESCRIPTION

Figure 1:
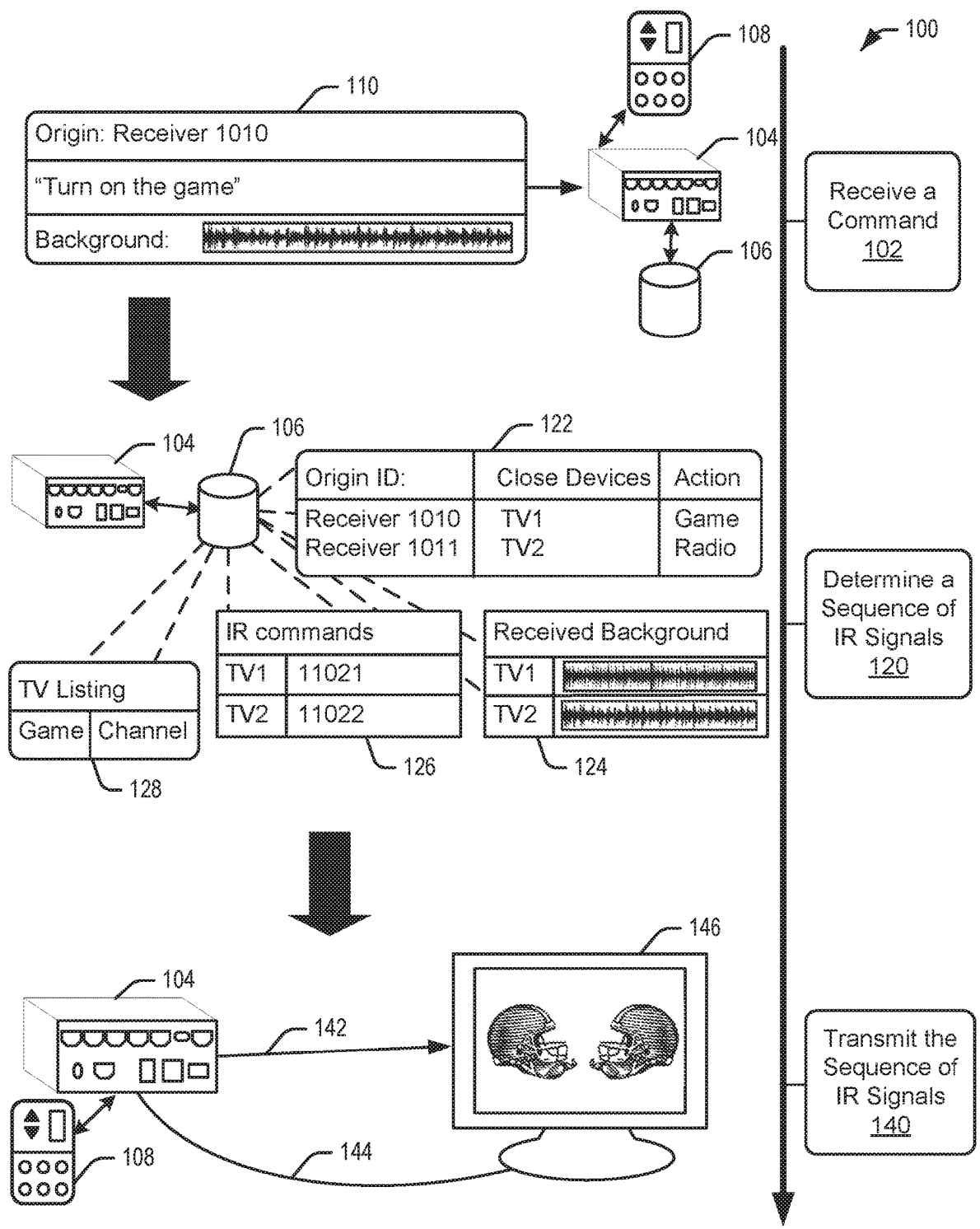
FIG. 1 illustrates an illustrative flow for determining and interacting with active devices described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the disclosure may improve upon conventional systems by implementing a hub device to help connect segments of the network, including a home network, using a central connection point that offers multiple ports. By implementing the hub device, the home network may create a centralized functionality of the network. Additionally, a remote controller may correspond with the hub device. The controller can be configured to integrate devices on the network using voice and infrared radiation (IR) command, location identification, or, when commands are received, overlaying information on top of messages that are meant to pass through to other devices on the network.

Embodiments of the disclosure may improve upon conventional systems, in which devices in a network may work independently. When the user attempts to use a remote control to turn on a device in the network, various remote controllers are used that accompany each device. Further, some users implement their home network using various devices that repeat functions of other devices. For example, a television and an audio amplifier for the television, where each remote controller can turn up the audio for the television (e.g., one through speakers in the television and one through an amplifier associated with the television, etc.). Further, when signals and other data is transmitted in the network, the devices might still work independently with little recourse to communicate between each other.

Embodiments of the present disclosure are also directed to, among other things, a hub device or system for providing instruction to devices in the network. The hub device may be a high-definition multimedia interface hub. For example, a list of currently active devices and a command may be received by the controller, where the controller comprises at least an infrared radiation (IR) transmitter. Based at least in part on the list of currently active devices and the command, the controller can determine a sequence of IR signals associated with at least one currently active device and transmit, utilizing the IR transmitter incorporated with the controller, the sequence of IR signals to one or more of the currently active devices.

In an illustrative example, a controller (e.g., a universal remote controller associated with a hub/switch device, a user device for operating a common connection device that provides a user interface for accepting commands, etc.) may be connected to a home network with a television, cable box, and amplifier. The controller receives an identification of the devices that are connected and/or active on the network, as well as information from a data store that identifies signals used to operate the devices. The network may also include a microphone that receives a command to turn on the television. The controller, hub, or backend server translates the audio command to turn on the television into a IR signal that the television recognizes when it receives the IR signal at an IR receiver. The controller then transmits the IR signal related to the television and the audio command, and the television turns on in response to the IR signal received from the controller.

In some embodiments of the present disclosure, the network may comprise more than one controller and use these controllers to learn which devices are in the network. For example, a first controller can maintain a set of candidate devices that may be active and/or accessible on the network. Each of the candidate devices may be associated with a digital fingerprint including at least one of: an IR carrier frequency and an IR command signal pattern. This digital fingerprint may, in some examples, be recognized by each device as corresponding with a particular command. The first controller may receive a first IR signal transmitted by a second controller and determine a reduced set of candidate devices. The reduced set of candidate devices may be determined by comparing the first IR signal with one or more digital fingerprints or other information for the set of candidate devices. When one or more devices do not match, that device may be removed from the set of candidate devices. The first controller may transmit IR signals to each of the reduced set of candidate devices.

In an illustrative example, the controller and corresponding device can determine what type of television, cable box, and amplifier are on a home network by maintaining a list of IR signals that these and other devices accept (e.g., to change a channel, to power on or off, etc.). When setting up the device on the network, an original controller associated with the television may be used to transmit information using the digital fingerprint (e.g., an IR carrier frequency, an IR command signal pattern, etc.). The controller can also receive that transmitted information and attempt to decode it. The controller can then identify the corresponding television by comparing the received digital fingerprint with saved information about all known devices. In some examples, this may improve a standard universal remote setup process, which might require a user to type in a serial number of a device, model number of a device, or labor through menus to identify a unique identifier corresponding to the digital fingerprint of the television.

In some embodiments of the present disclosure, the computer system may detect an initiation of an audio signal from at least two receiving devices in a network. In some examples, the two receiving devices may receive the initiation of the audio signal from a same source. The computer system can instruct a plurality of receiving devices in the network to activate microphones to accept the audio signal and to store a remaining audio signal from the same source. The computer system can receive location information from at least some of the receiving devices (e.g., to help identify where the audio signal is coming from, to help identify devices that are close to the origin of the audio signal, etc.). The computer system may determine a command that corresponds with the initiation of the audio signal and transmit the command to another device in the network that corresponds with the location information.

In an illustrative example, the home network can be established and may comprise at least two microphones, two television, the controller, and hub device. Both microphones may receive an audio signal. The controller can instruct storage devices in the network to store the audio signal (e.g., a memory associated with the device or backend data store, etc.) and/or provide location information using various methods discussed throughout the disclosure. Thus, the hub device may determine the command or the IR signal needed to control that television (e.g., that is closer based on the proximity of the location information, etc.) and transmit that command to the particular television to turn it on.

In some embodiments of the present disclosure, the computer system in a network can receive a list of active devices and instruct the active devices to identify their proximity to a user device (e.g., by pinging, by transmitting a communication to/from the user device, by receiving a transmitted signal from the user device, etc.). In some examples, the identification of the proximity may be based at least in part on audio signals. The computer system can receive the proximity information and determine a closest device based on the proximity information.

In an illustrative example, a speaker in the home network may emit a high frequency sound that is inaudible to the user, but received by the microphones in the network. The microphones may forward the high frequency sound to the hub device, where the hub device attempts to determine the location of the origins of each high frequency sound. The high frequency signals may vary by being louder closer to a location of a microphone, or may each emit different signals to help determine which high frequency sound is being received by the particular device.

The physical implementation of each device discussed herein may vary and are shown as examples of how the system may be implemented in practice. For example, the controller may be implemented with an IR receiver/transmitter, processor, and memory to store which devices are active on a network. In other examples, a common connection device or a remote server computer (e.g., on a cloud, virtual server, etc.) may be used. These implementations are provided as examples for illustrative purposes and should not be considered to limit the disclosure.

FIG. 1 illustrates an illustrative flow for determining and interacting with active devices described herein, according to at least one example. The process 100 can begin with receiving a command at 102. For example, a connection device 104 may receive a command 110. In some examples, the connection device 104 may be associated with a data store 106 and a controller 108, and/or a remote server (not shown), and any of these devices may alternatively receive the command 108.

The connection device 104 may comprise any common connection devices (e.g., a single device that provides a "common connection" for devices in a network, etc.) and/or other specialized connection devices, including for example, a hub. The connection device 104 may be used to connect segments of a local area network (LAN), including a home network. The connection device 104 may contain multiple ports, including high-definition video devices ("HDMI") or universal serial bus ("USB") ports. For example, when a packet arrives at one port, it may be copied to the other ports so that all segments of the network can see all packets by the connection device 104.

In some examples, the connection device 104 may comprise a switch or other device that filters and forwards packets between network segments. For example, at least a portion of the connection device 104 may operate at the data link layer (layer 2) or the network layer (layer 3) of the OSI Reference Model and/or support any packet protocol.

The implementation of the connection device 104, the data store 106, and controller 108 may vary. Based on the implementation in various embodiments of the disclosure, these or other devices may comprise different information. For example, the information that may be received and/or stored can include various information, including IR signals received in the network that may be transmitted from one or more controllers, a list of current information about IR signals and what active devices correspond with these IR signals, and a set of rules about making the decisions about which devices are present or active.

In some examples, the connection device 104 may determine a list of active devices (e.g., based on various methods discussed throughout the disclosure, etc.) or receive the list of active devices from the data store 106, and transmit the list to the controller 108. The controller 108 may detect different IR signals, frequencies, and patterns within a proximate distance of the controller 108. With the detected patterns, the controller 108 may compare the different patterns that it detects with the list of devices from the connection device 104. The controller 108 may narrow down the candidate devices to devices that are associated with IR signals that the controller 108 keeps receiving.

In another example, the connection device 104 may perform operations like a networking hub and the processing, analysis, and determination of active devices and IR signals may be implemented at a server computer (not shown). For example, the controller 108 may receive IR signals and transmit the IR signals to the connection device 104, and then to the server computer. The server computer may receive IR signals and/or determine which devices correspond with the received IR signals, at least in part to generate a list of active devices. The list of active devices and corresponding IR signals may be stored at a data store 106 (e.g., remote to the connection device 104, on a cloud network, etc.). When a command 110 is received, the connection device 104 or the server computer may determine which device and IR signal correspond with the command 110. The connection device 104 or the server computer may transmit the desired IR signal to the controller 108 to transmit the IR signal to the desired device.

In another example, the connection device 104 and data store 106 may be implemented as one device, separate from other devices (e.g., a television, etc.) that may be commanded by the controller 108. The connection device 104 may incorporate an IR receiver and an IR transmitter. The data store 106 may comprise a list of IR signals and their associated devices, as well as processes to determine which devices are active based on the IR signals that are received (e.g., as discussed herein).

In some examples, the connection device 104 may direct a command to a different device than an originating device. For example, when a command 110 is received, the connection device 104 may determine which device in the network to forward the command. The connection device 104 may determine which device should receive the command by following a set of rules (e.g., based on a user profile, based on historical interactions with particular device including temporal patterns or usage patterns, etc.).

In some examples, the connection device 104 may receive a list of currently active devices. The currently active devices may be active by being powered on and communicatively connected with the network. The connection device 104 may connect with active devices through wired or wireless methods (e.g., infrared radiation (IR) signals, HDMI messaging, etc.). The list of currently active devices may be stored with a data store 106. Other types of information may be stored with the data store 106 without diverting from the scope of the disclosure.

In some examples, the command 110 may comprise an origin of the command 110. For example, in a header of an electronic message, the command 110 (transmitted as the electronic message, etc.) may comprise an originating device that transmitted the command. In some examples, the origin of the command may be determined based at least in part on a digital fingerprint detected by the connection device (e.g., different IR signals, frequencies, and patterns compared to stored, known digital fingerprints of devices in the data store 106, etc.).

In another example, the command 110 may comprise a foreground audio signal that includes a verbal command (e.g., "turn on the game") and a background audio signal of an area around the source of the verbal command. For example, a user may speak "turn on the game" while a song plays in the background. The source of the song may be another device on the network, which can be used to help determine a location of the origin of the command (e.g., the background audio includes a song, so the microphone should be next to the speaker that is providing the song, etc.). The audio of the song may be included with the command 110.

The process 100 may also determine a sequence of IR signals at 120. For example, the connection device 104 may identify the list of currently active devices (e.g., plugged in and accepting commands, responds to a ping or communication, etc.) and determine one or more IR signals 126 that correspond with each active device, which may be stored with the data store 106.

As a sample illustration, television model A100 may be active in a network. This may include where the television is plugged into a wall and discoverable by the connection device 104, because both the television and the connection device 104 are on the same network. To turn on this model television, a remote device that is provided for that television transmits IR signal "0220E0040" (e.g., in hexadecimal code, etc.). When the television receives "0220E0040," the television may decode the IR signal to determine a corresponding command, which would be to turn on the television. In response, the television may provide power to a display screen to provide an image on the screen. Similarly, IR signal "EE000810E3" may turn up the volume of the television, such that when the IR receiver receives this IR signal, the television volume can turn up on response to the received IR signal.

The data store 106 may comprise a sequence of IR signals 126 for many devices. The sequence of IR signals may be determined by reverse-engineering (e.g., measuring each device between the device and controller, etc.). The data store 106 may also comprise a carrier frequency for the devices, or rely on a default carrier frequency (e.g., measured at 38 kHz, etc.).

The data store 106 may comprise proximity information 122 for devices in the network. For example, the data store 106 may receive a list of devices that are in a particular room, for one or more rooms in a home network, where the devices in the same room may be proximate device of each other. This may be received from a user device. In another example, the proximity information may be determined by positioning devices (e.g., local or global positioning system (GPS), etc.). The coordinates of the devices may be used to identify which devices are within a threshold distance of each other (e.g., within 5 feet of each other, including a microphone and a television, or a microphone and an amplifier, etc.), where the devices within the threshold distance of each other are proximate devices. In some examples, the proximity information 122 may be used to help identify a location of a user and devices that are close to a user (e.g., when the user provides a command, etc.).

In some examples, the proximity information 122 may comprise common uses for particular devices through temporal patterns or usage patterns. For example, a television device in a living room may be used to watch a football game every Saturday, a television device in a guest room may be used to watch a football game every Monday, and a radio may be used to listen to the football game every other Thursday. This pattern of interactions with the devices may be stored with the data store 106 and/or a user profile.

The data store 106 may comprise background information 124. As illustrated previously, background audio may comprise a song or other audio that is included with a command in an audio recording.

The background information 124 can be used to help determine proximity information 122. For example, background audio may be received from microphones associated with three devices. Two of the background audio may include a same song playing with the background audio and one of the background audio may not include the same song. The connection device 104 may compare the background audio and determine that the first two devices are close in location to each other and the third device is not close to the same location.

The data store 106 may comprise additional information 128 based on a type of device. For example, a television may correspond with a channel listing or a radio may correspond with a station listing. Other information may be stored as well without diverting from the essence of the disclosure.

In some examples, the additional information 128 may be compared with the command 110 (e.g., to identify additional information, etc.). For example, the command may include "turn on the game." The connection device 104 can identify that "game" corresponds with a sports game provided by a television device from information provided in the television channel listing (e.g., channel 2 corresponds with a football game at 1 pm, channel 3 corresponds with the news at 1 pm, so the connection device 104 determines that the user is referring to channel 2, etc.). The additional information 128 can identify one or more channels that display a game (e.g., by comparing a time that the command is received with the time that the game is provided by the channel, or limit games to channels that is subscribed to by the user, etc.). In some examples, the connection device 104 may confirm a channel and/or television listing (e.g., "would you like to play the sports team A game or the sports team B game?").

In some examples, the location or profile of the user may also help identify a game. For example, the user may be located in Seattle, Wash. When the "turn on the game" command is received, the connection device 104 can identify any games provided by channels for the device (e.g., listed in the television channel listing, etc.). The connection device 104 may limit the channel identify based on games for local teams or place games of local teams at a higher priority than games for non-local teams. In another example, the connection device 104 can limit the games to teams identified in the user profile (e.g., user A likes sports team A, so provide a channel with that sports team when user A provides the command, etc.).

In another example, the devices may be limited as well, based at least in part on the additional information 128. As a sample illustration, a game may be available through the radio, but not through the television. As such, the command may be transmitted to the radio device and not the television device, based at least in part on the additional information 128 identified for each of the devices.

The process 100 may also transmit a sequence of IR signals at 140. For example, the controller 108 (e.g., or connection device 104, etc.) may transmit the IR signals 142 using an IR transmitter to transmit the identified IR signals of a particular device 146. The device may comprise an IR receiver to accept the transmitted IR signals 142. The device 146 may be included with the list of currently active devices received by controller 108 and/or the connection device 104. In some examples, the connection device 104 may transmit a command to the device 146 using a wired communications connection 144 or a communication medium other than IR signals 142.

Figure 2:
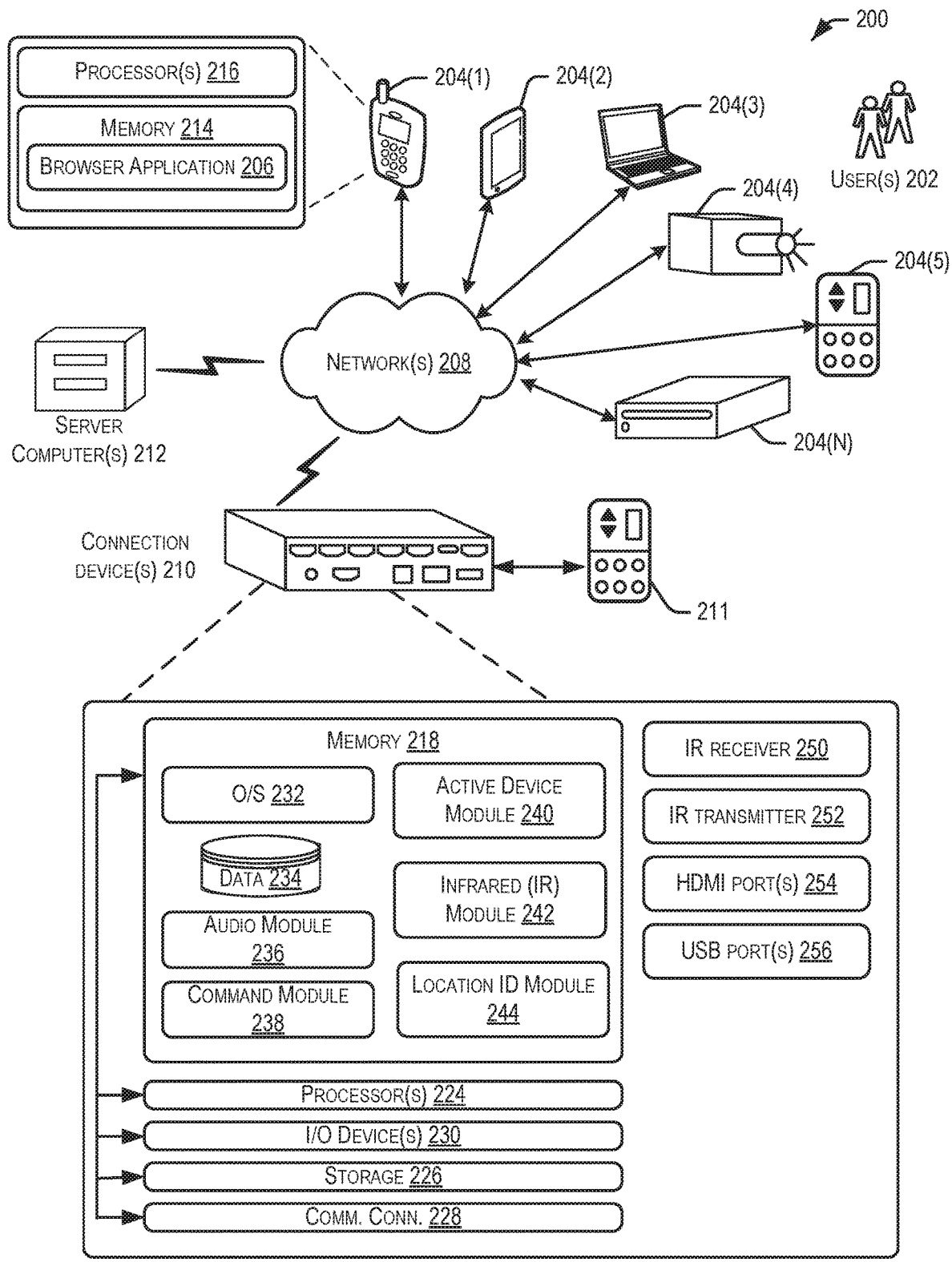
FIG. 2 illustrates an example architecture for determining and interacting with active devices described herein that includes a connection device, controller, and/or a user device connected via one or more networks, according to at least one example.

FIG. 2 illustrates an example architecture for determining and interacting with active devices described herein that includes a connection device, controller, and/or a user device connected via one or more networks, according to at least one example. In architecture 200, one or more users 202 (i.e., web browser users) may utilize user computing devices 204(1)-(N) (collectively, user devices 204) to interact with media or other content (e.g., by providing IR or audio commands, etc.).

The one or more user devices 204 may comprise a variety of devices. The one or more user devices 204 may comprise a user device 204(1), smart phone 204(2), personal computer 204(3), audio/visual (AV) equipment 204(4), remote controller 204(5), cable box, media player (e.g., Blu-ray player, compact disc (CD) player, etc.), microphones, speakers, and the like. These one or more user devices 204 may communicate with one or more connection devices 210 through wired or wireless communications, including via infrared radiation (IR) signals. In some examples, the user device 204 may receive communications via audio (e.g., from a user or device, captured by a microphone, etc.). The one or more connection devices 210 may comprise an IR receiver and/or IR transmitter, as well as an antennae or other hardware to communicate via the wired or wireless communication.

In some aspects, the one or more users 202 (i.e., web browser users) may utilize user computing devices 204(1)-(N) to access an application 206 (e.g., a web browser), via one or more networks 208. The application 206 may be hosted, managed, and/or provided by a computing resources service or service provider, such as by utilizing one or more service provider computers and/or one or more connection devices 210. In some examples, the one or more connection devices 210 (e.g., a hub device, etc.) may implement functionality interchangeably with one or more controllers 211 and/or one or more server computers 212 (e.g., remote to the one or more connection devices 210, on a cloud network, etc.), as discussed in FIG. 1.

The one or more server computers 212 (or one or more connection devices 210 or one or more controllers 211, etc.) may, in some examples, provide computing resources such as, but not limited to, client entities, low latency data storage, durable data storage, data access, management, virtualization, cloud-based software solutions, electronic content performance management, etc. The one or more server computers 212 may also be operable to provide web hosting, computer application development, and/or implementation platforms, combinations of the foregoing, or the like to the one or more users 202. The one or more server computers 212, in some examples, may help transmit commands and signals to devices in networks 208.

In some examples, the networks 208 may include any one or a combination of many different types of networks, such as a home network with interconnected devices, cable networks, the Internet, wireless networks, cellular networks and other private and/or public networks. While the illustrated example represents the users 202 accessing the application 206 over the networks 208, the described techniques may equally apply in instances where the users 202 interact with the one or more server computers 212 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more server computers 212, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the connection devices 210, one or more controllers 211, or one or more server computers 212 via the networks 208, or via other network connections. Additionally, the user devices 204 may be part of the distributed system managed by, controlled by, or otherwise part of the one or more server computers 212 (e.g., a console device integrated with the connection devices 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the connection devices 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the one or more connection devices 210, one or more controllers 211, and/or one or more server computers 212 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some examples, the one or more connection devices 210, one or more controllers 211, and/or one or more server computers 212 may be in communication with the user devices 204 and/or other service providers via the networks 208, or via other network connections. The more server computers 212, for example, may include one or more servers, perhaps arranged in a cluster, as a server farm, or as individual servers not associated with one another. These servers may be configured to implement the content performance management described herein as part of an integrated, distributed computing environment.

In one illustrative configuration, the connection devices 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of connection devices 210, the memory 218 may be volatile (such as RAM) and/or non-volatile (such as ROM, flash memory, etc.). The connection devices 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the connection devices 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the connection devices 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The connection devices 210 may also contain communications connection(s) 228 that allow the connection devices 210 to communicate with a stored database, another computing device or server, user terminals and/or other devices on the networks 208. The connection devices 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an audio module 236, a command module 238, an active devices module 240, an infrared radiation (IR) module 242, and/or a location identifier module 244. The modules may be software modules, hardware modules, or a combination thereof. If the modules are software modules, the modules will be embodied on a computer readable medium and processed by a processor in any of computer systems described herein.

The audio module 236 may be configured to receive audio from one or more microphones or other devices. For example, the audio module 236 may receive streaming audio or a stored audio file corresponding with audio from a microphone or other user device 204 in the network. In some examples, the audio module 236 may be configured to identify a source of the audio (e.g., with the location identifier module 244).

The command module 238 may be configured to interact with the audio module 236 to translate audio into a command. For example, the command module 238 may correlate the audio with a term and/or IR signal, such that when the audio is received, the command may be identified that corresponds with the received audio.

The active devices module 240 may be configured to determine one or more active devices on a network. For example, the active devices module 240 may identify active devices by pinging the device, communicating with the device, and the like. The devices that respond to these communications may be active. In some examples, the active devices may be limited to devices within particular local area network (LAN) or other limited geography (e.g., identified by IP addresses, etc.).

The infrared radiation (IR) module 242 may be configured to receive an IR signal. For example, using the IR receiver 250, the IR module 242 may receive and/or store the IR signal. The IR module 242 may be configured to analyze the IR signal to determine frequency, wavelength or other signal information associated with the IR signal (e.g., to determine an originating device, to determine a proximate location with the location ID module 244, etc.). In some examples, the IR module 242 may be configured to send the IR signal (e.g., using the IR transmitter 252) after IR signals are identified to correspond with the received commands.

The infrared radiation (IR) module 242 may also be configured to determine a command and/or translate the IR signal into a command. For example, the IR module 242 may detect an IR signal and, through communications with other devices on the network, determine that a particular device changed a state of the device (e.g., powered on in response to an IR signal associated with instructing the television to power on, etc.). The IR module 242 may determine that the detected signal is associated with that particular command and that particular device based in part on the historical data received.

In some examples, the IR module 242 may also be configured to broadcast IR signals (e.g., using the IR transmitter 252). This functionality, like the other modules, may also or alternatively be implemented with the controller 211.

The location identification (ID) module 244 may be configured to receive a high frequency signal and/or determine a location based at least in part on a high frequency signal. For example, devices (e.g., televisions, etc.) in the network may emit a high frequency sound that is inaudible to the user, but received by the microphones in the network. The microphones may transmit the high frequency signals to the audio module 236 to analyze. The high frequency signals may vary by being louder closer to a location of a microphone, or each device may emit different signals to help determine which high frequency sound is being received by the particular device.

The location identification (ID) module 244 may also be configured to determine a location of a device using a global positioning system (GPS) or other positioning system data associated with the device. For example, the location ID module 244 may comprise a geo-location device (e.g., a global positioning system (GPS) device or the like) for providing and/or recording geographic location information associated with the one or more connection devices 210 and/or other devices in the network.

The location identification (ID) module 244 may also be configured to determine location using gesture detection, implementing a microphone array, determining a direction of received audio, location detection by identifying a device that emits a signal, or other methods of determining location described herein.

The one or more connection devices 210 may also comprise an IR receiver 250. The IR receiver 250 may consist of hardware that may receive and decode IR signals that are broadcast by other devices. Similarly, the one or more connection devices 210 may also comprise an IR transmitter 252 or IR emitter. The IR transmitter 252 may produce light energy in the infrared spectrum in order to transmit infrared signals from the connection device 210. The IR transmitter 252 may comprise one or more light emitting diodes (LED) to produce the IR signal.

The one or more connection devices 210 may also comprise one or more HDMI ports 254 or USB ports 256 to transfer data using HDMI or USB compliant devices. For example, the HDMI ports 254 may receive and transmit compressed or uncompressed video and audio data from an HDMI-compliant source device. The USB ports 256 may receive and transfer, at a short-distance, digital data communications.

Figure 3:
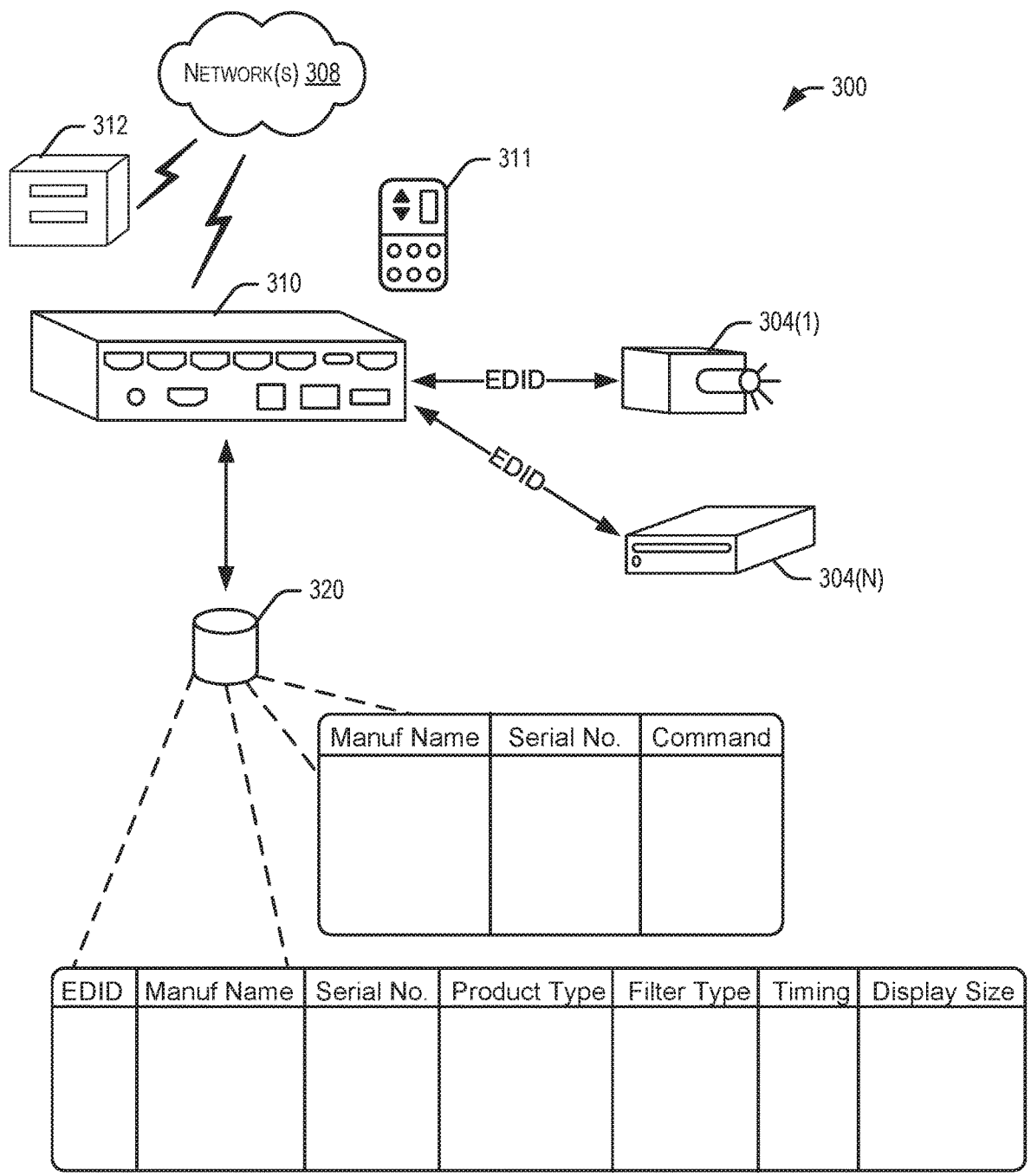
FIG. 3 illustrates an example architecture for determining and interacting with active devices described herein that includes a connection device, controller, and/or a user device connected via one or more networks, according to at least one example.

FIG. 3 illustrates an example architecture for determining and interacting with active devices described herein that includes a one or more connection devices 310, one or more controllers 311, and/or one or more user device(s) 304 connected via one or more networks 308, according to at least one example. The one or more connection devices 310 may communicate with a data store 320. In some examples, the one or more connection devices 310 (e.g., a hub device, etc.) may implement functionality interchangeably with one or more controllers 311 and/or one or more server computers 312 (e.g., remote to the one or more connection devices 310, on a cloud network, etc.), as discussed in FIGS. 1-2. The devices may communicate via a network 308, as illustrated in FIG. 2.

In some examples, wired functionality (e.g., HDMI, etc.) and wireless functionality (e.g., broadcasting IR signals, etc.) may be implemented with the same device. There may be many advantages to having wired and wireless technology separate or implemented on the same device. For example, technical complexity may be minimized by only having one implemented (e.g., wired or wireless, etc.). One advantage to having both wired and wireless functionality with the same device may include that the wired functionality may give more direct access to devices and more command ability of switching between devices for the one or more connection devices 310 or the one or more controllers 311. Additionally, the training phase (e.g., using a machine learning process, etc.) of the IR functionality may be simplified for the user, for example, because the connection device and the device associated with the controller can automatically interact to set up the device on the network through the wired communications, and accept wireless communications (IR signals) from the user after setup.

In some examples, IR signals and corresponding commands may be transferred to the one or more connection devices 310 (e.g., and stored in the data store, etc.). In some examples, the devices may also communicate a flag to the one or more connection devices 310 to identify whether the device is active (or inactive), which the one or more connection devices 310 may use to determine whether to add the device to the list of active devices.

In some examples, the communication between the one or more connection devices 310 may start with an initial handshake process. During this handshake, a device in the network may be plugged into the one or more connection devices 310 through a cable (e.g., HDMI cable, etc.). The device may transmit information about the device to the one or more connection devices 310, including an enhanced device identifier ("EDID").

The data store 320 may store information associated with the EDID. For example, the data store 320 may comprise a manufacturer name, serial number, product type, phosphor or filter type, timings supported by the display, display size, luminance data, and pixel mapping data.

Other information about the one or more user devices 304 may be stored in data store 320. For example, the data store 320 may include a manufacturer's name, serial number, and one or more commands that are recognized by that particular device. This information may be used to receive additional commands. In some examples, the one or more connection devices 310 may communicate via one or more networks 308 to a third party data store to request additional information about the device that corresponds with the manufacturer, serial number, or other information (e.g., model number, etc.). In some examples, the third party data store may transmit the additional information to the one or more connection devices 310 and/or data store 320. In some examples, the additional information may include IR signal information, as discussed herein.

Figure 4:
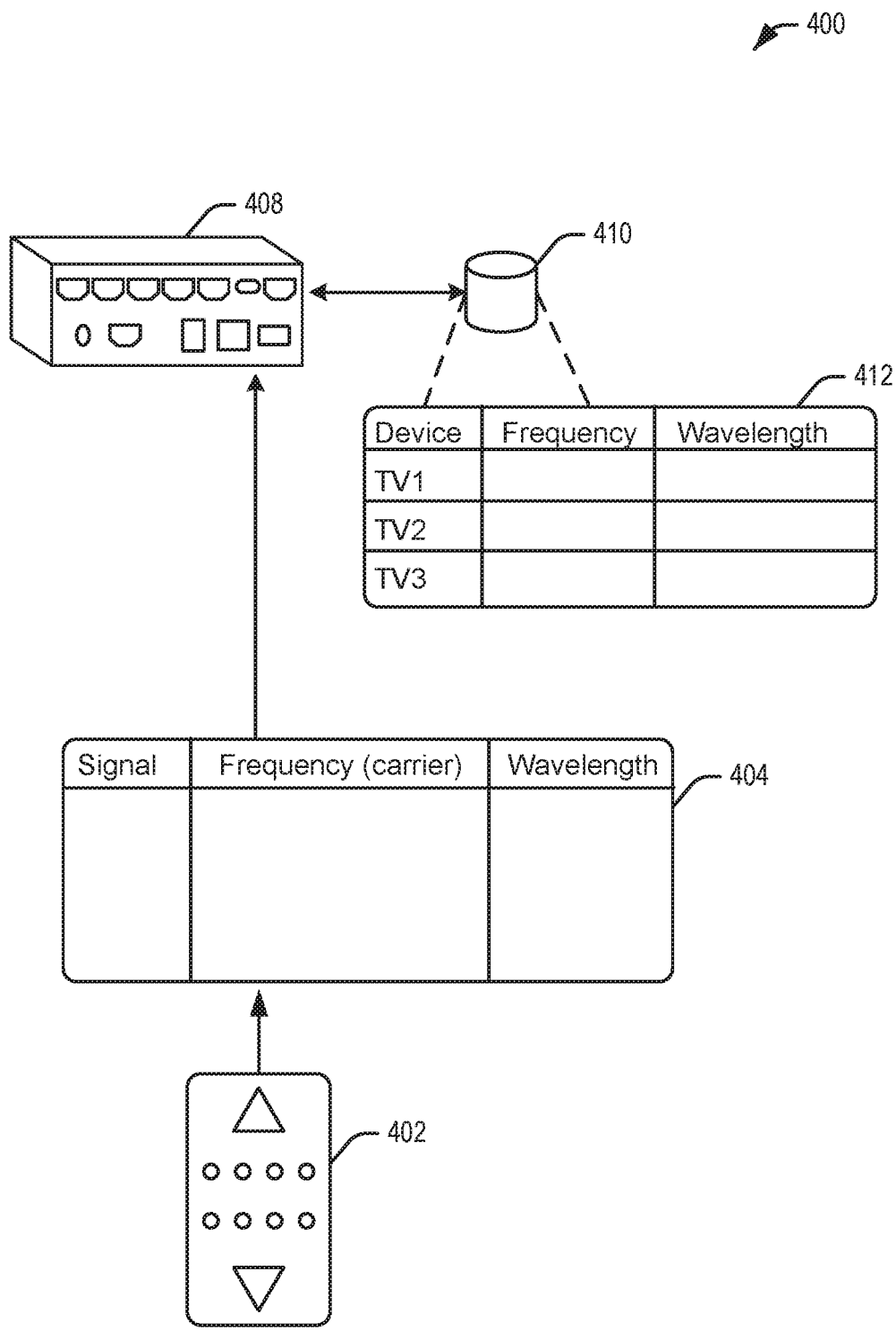
FIG. 4 illustrates an illustrative flow for identifying an origin of a signal described herein, according to at least one example.

FIG. 4 illustrates an illustrative flow for identifying an origin of a signal described herein, according to at least one example. For example, a controller 402 may transmit a signal 404 to a common connection device 408. The common connection device 408 may comprise an IR receiver to receive IR signals around the physical location of the common connection device 408. The common connection device 408 may be similar to the one or more communication devices 210 in FIG. 2.

The common connection device 408 may receive the signal 404 via an IR receiver, as illustrated in FIG. 2. In some examples, the common connection device 408 may detect IR signals that are transmitted between a device and a controller that is manufactured with the device (e.g., not a universal remote controller, etc.). The common connection device 408 may detect IR signals and, in some examples, learn the devices that are present. These devices may be added to the list of active devices.

The signal 404 may comprise a particular frequency or wavelength. For example, the wavelength may be the inverse of the spatial frequency of the signal 404. The common connection device 408 may analyze the frequency or wavelength to determine the speed, packets, or distance between repetitions of the wave, including peaks, valleys, or zero-crossings.

In some examples, the signal 404 may not pass a header or electronic message with the signal 404, including an identification of controller 402 that transmitted the signal 404. Instead, the signal 404 may send a pulse at a certain frequency or a particular frequency on a spectrum. The common connection device 408 may receive the signal 404 by constantly listening for pulses at the different spectrums. The common connection device 408 may receive signals on predefined spectrums that correspond with spectrums that are mapped to that device.

In some examples, the signal 408 may comprise a wavelength, carrier frequency, and/or a speed of the pulse of the signal 408 transmitted by the controller 402. In some examples, the controller 402 may have a finite number of types of signals that are associated with it, including a specific set of IR signals that the controller 402 may generate and/or receive.

In some examples, the common connection device 408 may determine an origin of a signal 404. For example, the common connection device 408 may receive three signals and each of the signals may have the same wavelength and the same carrier frequency. The common connection device 408 may determine that the three signals originate from a single remote. When comparing these received signals with a stored wavelength and/or carrier frequency, the common connection device 408 can determine an origin of the signal 404. As a sample illustration, the three signals may correspond with two possible television models. The televisions' corresponding controllers may correspond with those three different signals. For example, the two televisions may be similar models (e.g., one model year apart and slightly different, etc.).

In some examples, the origin of the IR signal 404 may not be connected to a network with the common connection device 408 (e.g., an air conditioning (AC) unit, baby monitor, lights, etc.).

The common connection device 408 may interact with a data store 410 to determine an origin of the signal 404 using stored digital fingerprints for devices in data 412. For example, the common connection device 408 may compare the frequency from the signal 404 with frequencies stored in the data store 410 for particular devices. When a match occurs, the common connection device 408 may identify the corresponding device in the set of devices in the data 412 as the originating device and/or controller 402 associate with the originating device.

The common connection device 408 may compare the frequencies using a autocorrelation algorithm. For example, the common connection device 408 may receive the signal 404, identify the frequency of the signal 404, determine a stored signal and/or frequency of a known device, and compare the stored frequency with the received frequency. When the stored frequency is within a threshold determination of the received frequency, the common connection device 408 can determine the origin of the received frequency as the origin identified with the stored frequency. When the stored frequency is outside of the threshold determination of the received frequency, the common connection device 408 can review other stored frequencies for a signal that matches the received frequency within the threshold.

Figure 5:
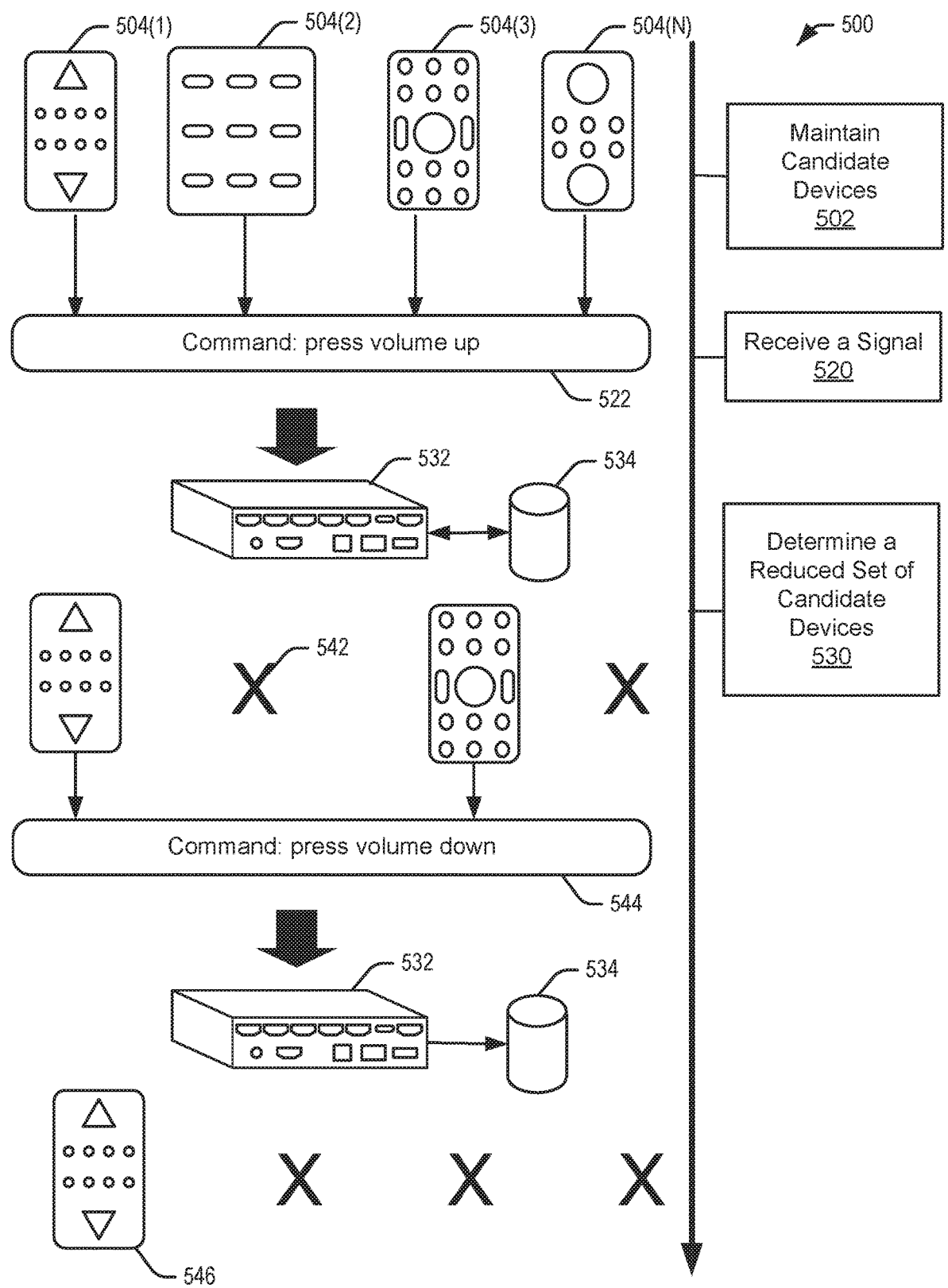
FIG. 5 illustrates an illustrative flow for determining a reduced set of candidate devices described herein, according to at least one example.

FIG. 5 illustrates an illustrative flow for determining a reduced set of candidate devices described herein, according to at least one example. The process 500 may be an active training process where the system instructs a user to provide a response and the system receives the response from the user, after the user is instructed. A passive training process may also be implemented, in some examples. In some examples, the training process may be implemented with a common connection device 532 that implements IR communications that receives IR communications when they are transmitted (e.g., without a preceding instruction, etc.). In some examples, the passive training process may be implemented by receiving communications in a wired technology, like HDMI communications. The training process may correspond with a machine learning process to help configure the controller to operate with a particular device.

In an active training process implementation, the process 500 may begin at 502 by maintaining a set of candidate devices. For example, a common connection device 532 and/or data store 534 may maintain candidate devices by storing these devices in the data store 534. One or more candidate devices may correspond with a controller 504 (e.g., provided by the manufacturer or supplier of the candidate device, etc.). Each controller 504 may be used to operate a candidate device using a particular signal pattern associated with that device. Different brands and models of devices may implement different signal patterns.

The common connection device 532 can identify the candidate devices using a variety of methods. For example, the candidate devices may comprise all available devices that are configured to operate on a network with the common connection device 532. In some examples, the candidate devices may comprise any devices available on the network (e.g., within a home, connected to a wireless or wired network, plugged in and able to accept communications and/or IR signals, even if the IR signals do not originate with the network, etc.).

The process 500 may receive a signal in response to the active instruction or passive transmitting of IR signals at 520. For example, in the active training process, the common connection device 532 can instruct a user to press a button on a controller (e.g., via an audio signal, etc.). The instruction may also or alternatively be displayed on a monitor associated with the common connection device 532 or other device (e.g., a user device 204). In response, the controller 504 may emit a signal 522. As illustrated, the instruction may include "press volume up," a user may press the up volume on a remote provided by the manufacturer of the device, and the signal received by the common connection device 532 from the controller 504 may be the particular signal associated with that controller and device.

The process 500 may determine a reduced set of candidate devices at 530. For example, after the comparison, the common connection device 532 may identify one or more devices that do not correspond with the received signal and instructed command. These devices may be filtered or otherwise removed 542 as candidate devices. The common connection device 532 may generate a reduced set of candidate devices based at least in part on the filtering and/or removal of the devices, which include devices with IR signals that correspond with the received signal for the instructed command.

In some examples, a second instruction may be presented, instructing the user to press a second button on the controller associated with a second signal 544. The second instruction may be provided if more than one device remains in the reduced set of candidate devices. The instruction can again be displayed on a monitor associated with the common connection device 532 or other device (e.g., a user device 204). In response, the controller 504 may emit the second signal 544. As illustrated, the instruction may include "press volume down," and the signal received by the common connection device 532 from the controller 504 may be the particular signal associated with that controller and device.

The reduced set of candidate devices may be further reduced or limited to candidate devices that correspond with the first signal 522 and the second signal 544. For example, after the comparison, the common connection device 532 may identify one or more devices that do not correspond with the received second signal. These devices may be filtered or otherwise removed 542 as candidate devices, until one or more candidate devices 546 remain. The remaining candidate device 546 may correspond with a particular device that the common connection device 532 is able to identify by digital fingerprints stored with the data store 534.

The training process may also be passive. For example, the common connection device 532 may receive IR signals passively (e.g., without requesting an IR signal, without displaying prompt to ask for a command, etc.). When one or more IR signals are transmitted within a proximate distance of the common connection device 532, the IR receiver of the common connection device 532 may receive the IR signals and store these signals (or frequency or wavelength, etc.). The received IR signals may be compared to determine the potential source device of the IR signal (e.g., using an audio comparison algorithm at the common connection device 532, etc.).

The training process may also determine what devices are used for particular functions. For example, the common connection device 532 may receive signals and determine the corresponding devices for each of the signals. The common connection device 532 can determine additional information for the devices, including temporal patterns (e.g., Monday nights, mornings for 1 hour on Channel 1, etc.) or usage patterns of the device (e.g., using an audio amplifier instead of a volume through a television, etc.).

Figure 6:
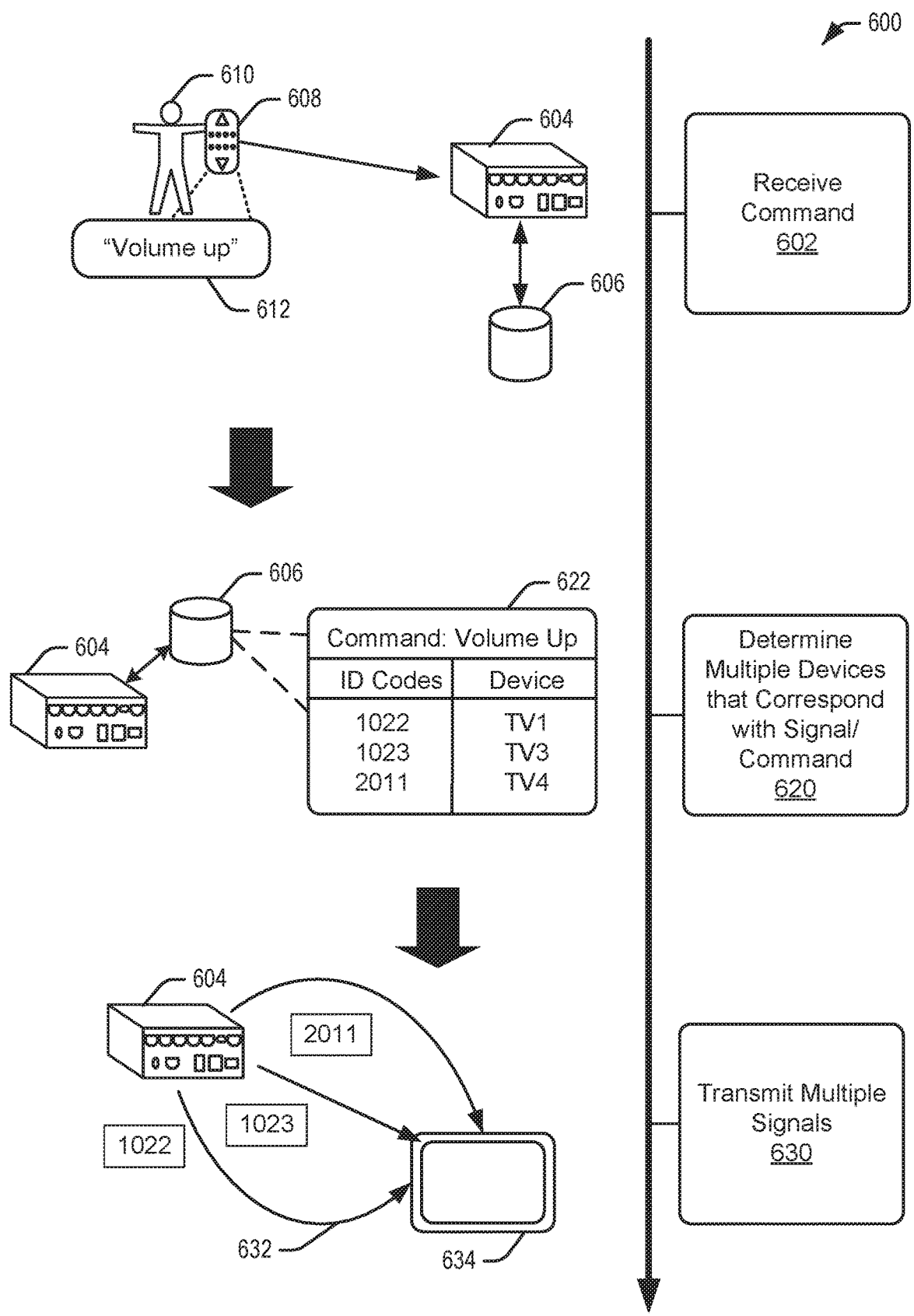
FIG. 6 illustrates an illustrative flow for disambiguating devices described herein, according to at least one example.

In some examples, more than one remaining candidate device 546 may accept the same set of IR signals, as illustrated with FIG. 6. FIG. 6 illustrates an illustrative flow for disambiguating devices described herein, according to at least one example. The process 600 may be implemented when multiple candidate devices accept a same signal pattern for a same command. In some examples, multiple IR signals may be transmitted to the same device, without the ability to disambiguate a single IR signal that may provide the appropriate command to the particular device.

The process 600 may begin by receiving a command at 602. For example, a common connection device 604 may receive a command 612 from a controller 608 operated by a user 610. In some examples, the user 610 may press a "volume up" button provided by the controller 608. The common connection device 604 may be similar to the one or more communication devices 210 in FIG. 2.

During the training phase (e.g., active or passive), the common connection device 604 may not have been able to disambiguate the IR signal from the controller, and may rely on more than one set of candidate devices (e.g., as illustrated in FIG. 5) to control this particular device. For example, when the common connection device 604 instructed the user to press "power" and the user pressed a power button on the manufacturer's remote, the IR signal that corresponded with that button press may have matched three other devices. In some examples, the data store 606 may comprise each of the three sets of IR signals for each device. In turn, other commands may correspond with multiple IR signals that have not been disambiguated.

The process 600 may determine multiple devices that correspond with the signal and/or command during the training process at 620. For example, a common connection device 604 may identify the IR signals that correspond with the command 612. This information may be stored in data store 606 during the training process and accessed by the common connection device 604 after the training process has been completed, when attempting to determine which IR signal to transmit to the particular device for the command 612.

The process 600 may transmit multiple signals at 630. For example, a common connection device 604 may identify the three IR signals that correspond with the command 612 and transmit all of them for the device 634. In some examples, at least one of these three signals may operate device 634.

In some examples, the initial command 612 may be an audio command after the training process has been completed. In this process, the common connection device 604 may receive the audio command 612 from a controller 608 operated by a user 610 after the user 610 speaks the command 612 (e.g., "volume up") into a microphone associated with the controller 608.

The controller 608 may transmit the command 612 to the common connection device 604. The common connection device 604 may interact with a data store 606 to determine location information of the user 610 associated with the command 612. The common connection device 604 may also determine location information for other devices, at least in part to determine which other devices are close to the user 610 that may be associated with the command 612.

Multiple devices may be determined that correspond with the signal and/or command. For example, a common connection device 604 may analyze the location information to determine one or more devices within a proximate distance of the user 610. This information may be stored in data store 606 and accessed by the common connection device 604 when attempting to determine which device may correspond with the command.

The common connection device 604 may determine an appropriate device 634 based at least in part on the location information (e.g., proximate devices, devices within a proximate distance of the user 610, etc.), temporal patterns, or usage patterns. The common connection device 604 or controller can transmit the IR signal for the command 612 associated with the device 634 to the desired device (e.g., in order to turn up the volume, as commanded, based on the patterns or location, etc.).

Figure 7:
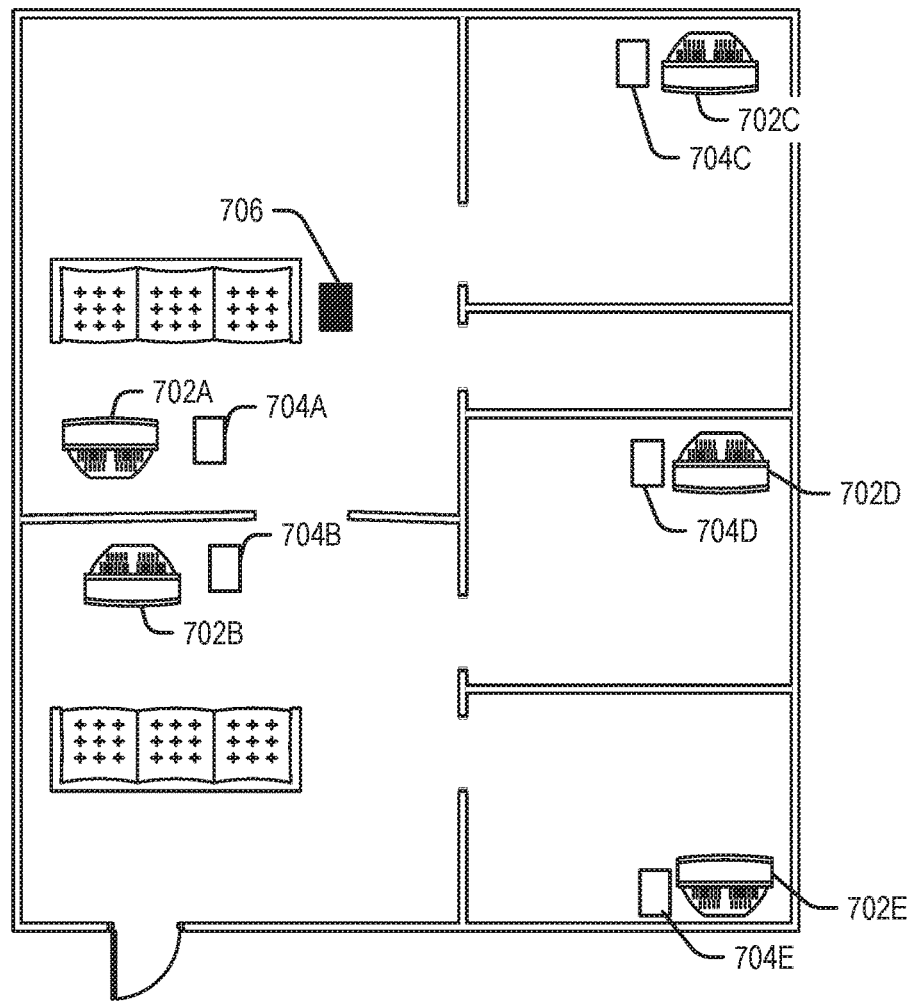
FIG. 7 illustrates an illustrative flow for disambiguating devices of a signal described herein, according to at least one example.

FIG. 7 illustrates an illustrative flow for disambiguating devices of a signal described herein, according to at least one example. In illustration 700, devices 702 and microphones 704 may be located throughout a house and the system may decide which device to control, using the connection device 706. The devices 702 may provide media content (e.g., television, amplifier, disc players, etc.) and microphones 704 may receive foreground audio (e.g., user's commands, etc.) and background audio (e.g., television or song playing, etc.). In some examples, the connection device 706 may interact with a data store (not shown) to store user preference information corresponding with particular devices that are used at particular times of the day (e.g., watch a sports game in living room or watch TV with an amplifier, etc.).

In some examples, the devices 702 and microphones 704 may be communicatively connected in a home network with a common connection device 706. The devices 702 and microphones 704 may be connected through wired (e.g., HDMI, USB, etc.) or wireless connections. In either method, one or more controllers may operate the devices 702 and microphones 704. Other devices may be implemented in the network without diverting from the essence of the disclosure.

The devices 702 may be identified as active devices through various methods discussed herein. For example, the device and/or controller associated with the device may emit IR signals, and a device in the network may determine that the device is able to accept communications. In another example, the devices may be connected through wired communications as well and, as such, the wired communications may confirm that the device is active and able to accept communications.

Once devices are determined to be active, the devices may accept a command. For example, a controller associated with the device may transmit an IR signal that is received by the device. The IR signal may correspond with a command (e.g., power on, turn up the volume, etc.). The device may adjust a state of the device in response to the received IR signal (e.g., turn on power to the device, turn up a volume on the device, etc.).

In some examples, the command may be an audio command. For example, a user may speak "turn on the TV" into a particular microphone associated with the device (e.g., a microphone installed in the television, etc.). The device that corresponds with the microphone may translate the audio with a command recognized by the device. For example, the device may comprise a speech recognition algorithm to translate the audio into a command recognized by the device. The algorithm may comprise, for example, "automatic speech recognition" (ASR), "computer speech recognition", "text to audio," or a "speech to text" (STT) algorithms.

The audio command may correspond with an initiating of an audio signal that comprises the audio command. For example, the audio signal may begin with audio that is not associated with the command and connection device 706 can instruct a plurality of receiving devices (e.g., microphones, etc.) in the network to activate microphones to accept the audio signal. The devices may store a remaining audio signal from the same source. The audio signal can be recorded, analyzed, and/or stored (e.g., to identify the command within the audio signal, to identify a location of the source, etc.).

In some examples, the audio command may be received at more than one microphone, a plurality of microphones (e.g., microphone array, etc.), or at a microphone that is not implemented with another device (e.g., a stand-alone microphone, etc.). For example, the connection device 706 may instruct all microphones to receive or record the audio signal. The devices with the most similar audio signal (e.g., analyzed by connection device 706 using an audio comparison algorithm, etc.) may be the devices that are closest to the user who is providing the audio signal or initiating an audio command.

In some examples, the audio command may be transmitted to a central device (e.g., a common connection device, backend server computer, etc.). For example, one or more microphones 704 may receive the audio signal and transmit the audio signal to the connection device 706 or a backend server computer (e.g., on a cloud, a virtual server, etc.). These devices may translate the audio command into a IR signal that the devices 702 recognize when it receives the IR signal at an IR receiver. The connection device 706 or a backend server computer can transmit the IR signal to the controller to transmit to the devices.

Locations of devices 702 and/or users may be determined. For example, the connection device 706 can receive location information from at least some of the receiving devices (e.g., to help identify where an audio signal is coming from, to help identify devices that are close to the origin of the command or next to a user, etc.). In some examples, the user may operate a user device (e.g., a smart phone, wearable technology, etc.) that emits a wireless signal that comprises a location of the user (e.g., global or local positioning system, GPS, etc.)

Locations of devices 702 may be determined and/or updated by asking a user. For example, a user may provide an audio command (e.g., "turn on the game") and the device 702 or connection device 706 can respond by providing a question or second audio command in response to the user's audio command (e.g., "shall I turn that on the living room television," or "shall I turn on in the living room or the den," etc.). The response may be provided through a pre-recorded audio signal or using an audio generation algorithm (e.g., text to speech, text to audio, etc.). In some examples, the response can be provided on a display to be read by the user. The response may be analyzed to identify location information (e.g., "yes, the living room television," etc.) and/or used to update other location information (e.g., there is a television in the living room, etc.).

The location of the devices 702 may be determined by temporal patterns or usage patterns. For example, the location of the devices 702 may not be determined and instead, the device identified for the command may be identified based on these patterns (e.g., identified in a user profile, etc.). The temporal patterns or usage patterns may be based on historical interactions with one or more particular devices. For example, a television device in a living room may be used to watch a football game every Saturday, a television device in a guest room may be used to watch a football game every Monday, and a radio may be used to listen to the football game every Thursday.

In some examples, the connection device 706 can receive a list of active devices and instruct the active devices to identify their proximity to a user device (e.g., by pinging, by transmitting a communication to/from the user device, by receiving a transmitted signal from the user device, etc.). The identification of the proximity may be based at least in part on audio signals. The connection device 706 can receive the proximity information and determine a closest device based on the proximity information.

In some examples, location may be detected by a wireless signal provided by the device (e.g., one or more devices 702 emit a wireless signal that is received by the connection device 706, etc.). For example, the devices 702 may broadcast a Wi-Fi signal. The location of the device may be identified by analyzing the Wi-Fi signal from the device 702 by the connection device 706. A user location may also be identified by detecting a Wi-Fi signal being broadcast from a device that the user is operating and/or wearing.

In some examples, a location may be determined by gesture detection. For example, a wireless signal (e.g., Wi-Fi signal, etc.) may be detected by the connection device 706 as changing as the device that is emitting the wireless signal moves. As the strength of the wireless signal changes, the device may be determined to move closer or farther from the connection device 706, which is analyzing the wireless signal. A similar gesture detection may accompany an audio signal. For example, when the audio signal becomes louder, the source of the audio signal (e.g., the user, etc.) may be determined to move closer from the connection device 706, which is analyzing the audio signal as it is received from the microphones 704.

The gesture detection may be performed using a gesture recognition device. For example, an example gesture recognition device is described in "Bringing Gesture Recognition to All Devices" by Kellogg et al., which is herein incorporated by reference for all purposes. The gestures and additional information identified from the gesture recognition device can be used to determine proximity information for the connection device 706.

In some examples, the location may be identified in part by implementing a microphone array. In some examples, the microphone array may include any number of microphones that can receive audio from an audio source and provide the audio to the connection device 706. The connection device 706 can record and/or analyze the received audio from the microphone array, at least in part by correlating the location of the microphone in the microphone array with the location of the audio source. In some examples, the locations of the one or more microphones in the microphone array may be fixed by a physical relationship in space between the different individual microphones. The audio may correspond with direction information as well (e.g., decreasing audio level as audio source moves away from the microphone, gesture detection, etc.).

In some examples, the location of other devices may be identified by a user device. For example, the user may operate a user device that emits a wireless signal and receives one or more wireless signals, such that the user device can determine which wireless signals that are stronger or weaker based on the signal strength of the received signal. The stronger wireless signals may be closer to the user device and the weaker wireless signals may be farther away from the user device. These signal strengths may be shared between devices and/or devices and the devices can collectively determine their proximity to each other based on the relative signal strength to other devices (e.g., two devices with stronger signals from device A, but one device has a stronger signal strength to device B than to device C, relating to the relative location of that device being closer to device B than to device C, etc.).

In some examples, the location of other devices may be identified by these other devices (e.g., as a constant location detection, a location detection without a previously received command, etc.). For example, the devices may broadcast one or more wireless signals that are received by other devices in the network. The wireless signals may be transmitted and received between these devices. In some examples, the devices may determine the location of itself based in part on the relative location of the device to other devices (e.g., within 5 feet of device A and device B, etc.).

In some examples, the connection device 706 can request location information from the devices in the network irrespective of receiving a command. The connection device 706 may identify the locations of the devices periodically and/or in response to receiving the command.

Devices may be disambiguated using various methods. For example, once a command is received and analyzed, the device may transmit a question to clarify the command. The question may include "did you mean the television in the living room" or "did you want to turn on the television next to you?"

The devices may be disambiguated by emitting a high frequency signal. In an illustrative example, a speaker associated with the devices 702 may emit a high frequency sound that is inaudible to the user, but received by the microphones 704 in the network. The microphones may forward the high frequency sound to the connection device 706, where the connection device 706 attempts to determine the location of the origins of each high frequency sound. The high frequency signals may vary by being louder closer to a location of each microphone 704, or each device 702 may emit different signals to help determine which high frequency sound is being received by the particular microphone.

The high frequency sound may be emitted from a first microphone associated with a command. For example, the microphone may receive an initialization of an audio signal and, in response to receiving the audio signal, emit the high frequency sound. The high frequency sound may be received by connection device 706. The connection device 706 can determine the origin of the audio signal as corresponding with the device that is emitting the high frequency sound (e.g., using a different frequency than other devices, etc.). Comparatively, each device 702 may emit sounds that are either different frequencies all at once or emit sounds in a specific order (e.g., each emitting sounds for a quarter of a second, etc.). The connection device 706 can identify which device had the highest signal output to identify which one is closest.

The high frequency sound may be emitted using various technology. For example, a high frequency sound may correspond with an octave band between 1,000-8,000 Hz. The high frequency sound may be generated and emitted by an oscillator, transmitter, or other sound producing equipment.

In some examples, the connection device 706 may determine a command that corresponds with the initiation of the audio signal, and the connection device 706 can transmit the command to another device in the network that corresponds with the location information. For example, the command may be transmitted to the device associated with the temporal or usage pattern (e.g., the current day is Monday, so transfer the command to watch the game to the device that historically provides the game on Mondays, etc.), or the device that is closest to the user based on the high frequency sound when the user provides the command.

Figure 8:
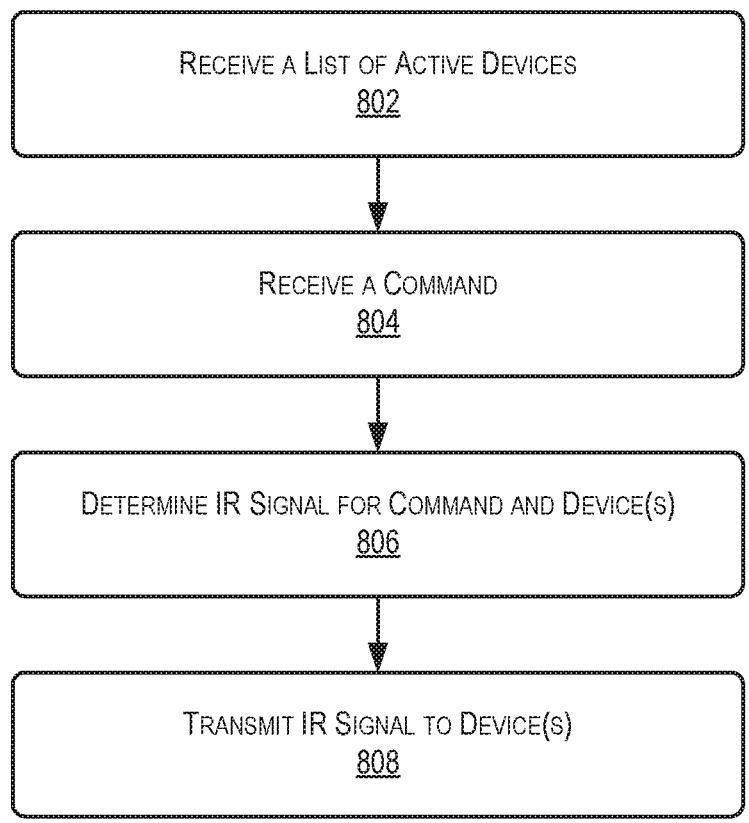
FIG. 8 illustrates an illustrative flow for determining and interacting with active devices described herein, according to at least one example.

FIG. 8 illustrates an illustrative flow for determining and interacting with active devices described herein, according to at least one example. In some examples, the one or more connection devices 210, one or more controllers 211 and/or one or more server computers 212 (e.g., utilizing at least one of the audio module 236, the command module 238, the active devices module 240, the IR module 242, and/or the location identifier module 244) or one or more user devices 204 shown in FIG. 2 may perform the process 800 of FIG. 8.

Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 800 may begin at 802 by receive a list of active devices. For example, the one or more controllers 211 may receive a list of active devices from a data store or from the devices themselves. At 804, a command may be received. For example, the one or more controllers 211 may receive the command from an audio signal (e.g., the user speaking the command, an IR signal from a remote, etc.). At 806, an IR signal may be determined for the command and device. For example, the one or more controllers 211 may analyze the received command and translate that command to an IR signal that is recognizable by the device. At 808, the IR signal may be transmitted. For example, the one or more controllers 211 may determine the IR signal and transmit it to the device that recognizes the IR signal.

Figure 9:
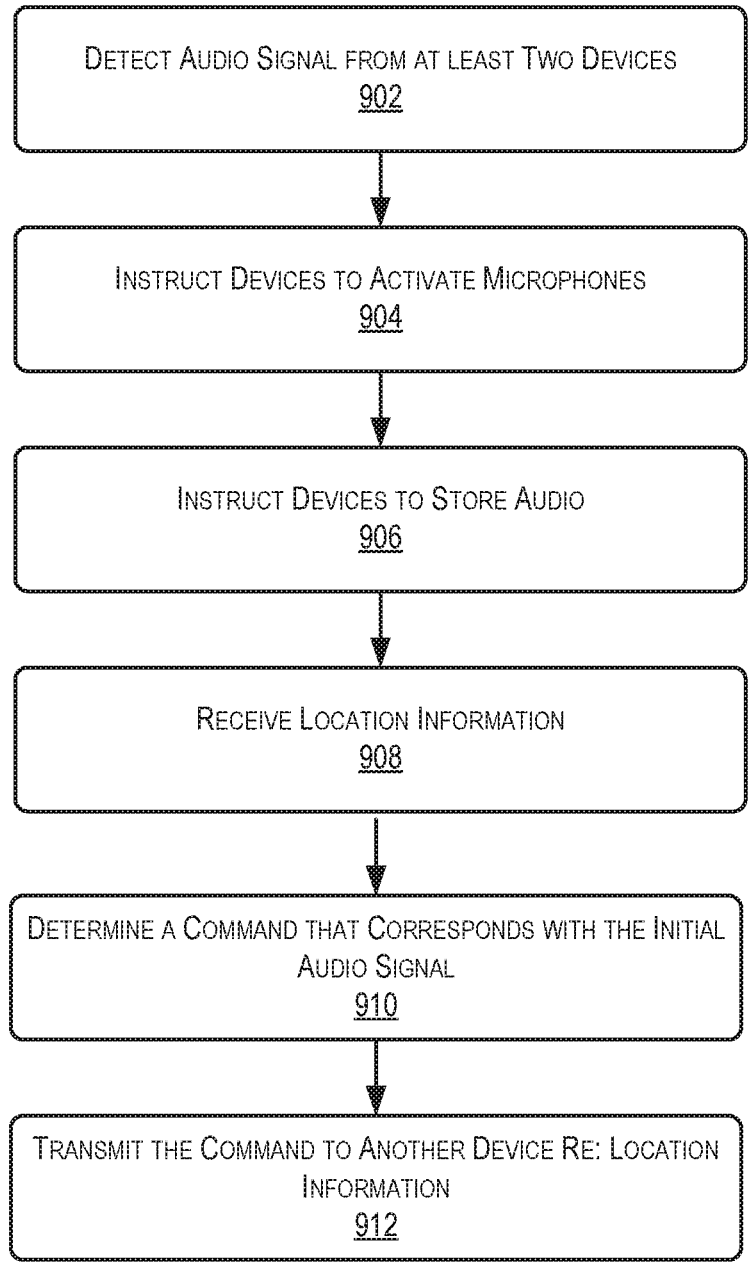
FIG. 9 illustrates an illustrative flow for disambiguating devices described herein, according to at least one example.

FIG. 9 illustrates an illustrative flow for disambiguating devices described herein, according to at least one example. In some examples, the one or more connection devices 210, one or more controllers 211 and/or one or more server computers 212 (e.g., utilizing at least one of the audio module 236, the command module 238, the active devices module 240, the IR module 242, and/or the location identifier module 244) or one or more user devices 204 shown in FIG. 2 may perform the process 900 of FIG. 9.

Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 900 may begin at 902 by detecting audio from at least two devices. For example, the connection devices 210 may receive audio from a microphone. At 904, devices may be instructed to active microphones. For example, the connection devices 210 may instruct microphones to in order to accept the audio signal. At 906, devices may be instructed to store audio (e.g., by the one or more connection devices 210, etc.) or through internal machine learning that automatically stores the audio signal. At 908, location information may be received. For example, the connection devices 210 may receive GPS data, high frequency sounds, wireless signals, or other information to identify locations discussed herein. At 910, a command associated with the original audio signal may be determined (e.g., by the one or more connection devices 210, etc.). At 912, the command may be transmitted to another device associated with the location information (e.g., by the one or more connection devices 210, etc.).

Figure 10:
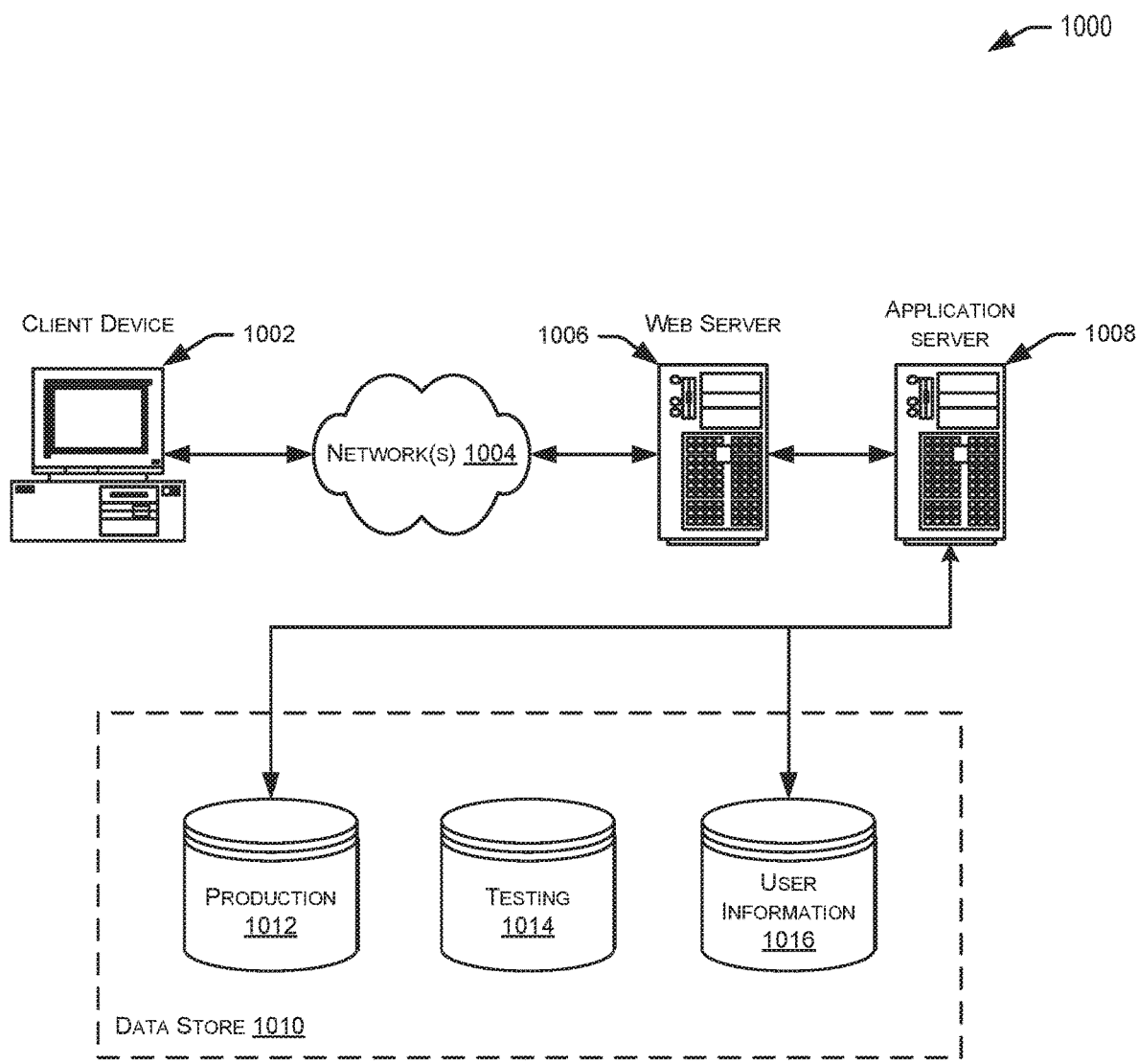
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a networking hub device configured to send and receive infrared radiation (IR) command signal patterns, a set of candidate device identifiers, each candidate device identifier being associated with a digital fingerprint comprising an IR command signal pattern, the digital fingerprint being associated with a command to perform a corresponding action;
   detecting, by the networking hub device, presence of a controlled device based at least in part on detecting a wireless transmission from a device controller of a particular IR command signal pattern commanding the controlled device to perform a particular action, the controlled device, the device controller, and the networking hub device being separate and distinct devices;
   determining, by the networking hub device, that the controlled device being commanded corresponds to a particular candidate device identifier of the set of candidate device identifiers based at least in part on comparing the particular IR command signal received from the device controller to digital fingerprints corresponding to the set of candidate devices identifiers; and
   adding the particular candidate device identifier corresponding to the controlled device to a set of active devices maintained by the networking hub device, whereby a subsequently received command causes the networking hub device to transmit data via an IR transmitter to a device selected from the set of active devices.

2. The computer-implemented method of claim 1, further comprising:
   receiving, from a microphone of a network device, an audible command; and
   identifying, by the networking hub device from the set of active devices, a particular active device based at least in part on identifying that the audible command relates to a particular type of device corresponding to the particular active device.

3. The computer-implemented method of claim 2, further comprising:
   transmitting, by the networking hub device, a subsequent IR command signal pattern corresponding to the audible command to the particular active device.

4. The computer-implemented method of claim 1, further comprising:
   receiving, by the networking hub device, a subsequent IR command signal pattern;
   identifying, by the networking hub device, a particular device from the set of active devices based at least in part on comparing the subsequent IR command signal pattern to IR command signal patterns of the set of active devices.

5. The computer-implemented method of claim 4, further comprising:
   forwarding, by the networking hub device, the subsequent IR command signal pattern to the particular device identified.

6. A networking hub device configured to send and receive infrared radiation (IR) command signal patterns, the networking hub device comprising:
   one or more processors;
   an IR receiver;
   an IR transmitter; and
   one or more memories collectively storing executable instructions that, when executed with the one or more processors, cause the networking hub device to, at least:
      obtain a set of candidate device identifiers, each candidate device identifier being associated with a digital fingerprint comprising an IR carrier frequency and a corresponding IR command signal pattern, the digital fingerprint being associated with a command to perform a corresponding action;
      detect, via the IR receiver, the presence of a controlled device based at least in part on detecting a wireless transmission from a device controller of a first IR command signal pattern commanding the controlled device to perform a particular action, the controlled device, the device controller, and the networking hub device being separate and distinct devices;
      determine that the controlled device being commanded corresponds to a particular candidate device identifier based at least in part on comparing the first IR signal received from the device controller to digital fingerprints corresponding to the set of candidate device identifiers; and
      add the particular candidate device identifier to a set of active devices maintained by the networking hub device, whereby a subsequently received command causes the networking hub device to transmit data via the IR transmitter to a device selected from the set of active devices.

7. The networking hub device of claim 6, wherein executing the instructions with the one or more processors further causes the networking hub device to:
   receive an audio signal comprising an audible command and background sound;
   identify, from the set of active devices, a source of the background sound;

identify, from the set of active devices, a particular device related to the audible command based at least in part on the audible command and the source of the background sound; and transmit a subsequent IR command signal pattern associated with a particular command recognizable by the particular device, the particular command being related to the audible command received.

8. The networking hub device of claim 6, wherein each of the set of candidate device identifiers are associated with a corresponding plurality of IR command signal patterns corresponding to commands that are recognizable by a candidate device.

9. The networking hub device of claim 6, wherein executing the instructions with the one or more processors further causes the networking hub device to:
receive proximity information identifying locations of each of the set of active devices;
receive an audible command;
identify a particular device from the set of active devices based at least in part on the locations of each of the set of active devices and the audible command; and
transmit, to the particular device, a subsequent IR command signal pattern corresponding to the audible command.

10. The networking hub device of claim 9, wherein executing the instructions with the one or more processors further causes the networking hub device to identify a location of a user that initiated the audible command, wherein identifying the particular device is further based at least in part on the location of the user.

11. The networking hub device of claim 6, wherein executing the instructions with the one or more processors further causes the networking hub device to:
receive an audible command;
identify a particular device from the set of active devices based at least in part on the audible command;
identify channel information corresponding to the particular device;
obtain user input utilizing the channel information; and
transmit, to the particular device, a subsequent IR command signal pattern based at least in part on the audible command and the user input.

12. The networking hub device of claim 6, wherein the set of active devices have differing carrier frequencies.

13. The networking hub device of claim 6, wherein executing the instructions with the one or more processors further causes the networking hub device to:
receive an audible command;
identify at least two devices of the set of active devices to which the audible command potentially corresponds;
provide output at the networking hub device identifying the at least two devices;
receive user input at the networking hub device identifying a particular device of the at least two devices; and
transmit, to the particular device, a subsequent IR command signal pattern corresponding to the audible command.

14. One or more computer-readable storage media collectively storing computer-executable instructions that, when executed by one or more processors of a networking hub device configured to send and receive infrared radiation (IR) command signal patterns, configure the networking hub device to perform operations comprising:

maintaining a set of candidate device identifiers, each candidate device identifier being associated with a digital fingerprint comprising an IR command signal pattern, the digital fingerprint being associated with a command to perform a corresponding action;
detecting the presence of a controlled device based at least in part on detecting a wireless transmission from a device controller of a particular IR command signal pattern commanding the controlled device to perform a particular action, the controlled device, the device controller, and the networking hub device being separate and distinct devices;
determining that the controlled device being commanded corresponds to a particular candidate device identifier of the set of candidate device identifiers based at least in part on comparing the IR command signal pattern from the device controller to digital fingerprints corresponding to the set of candidate device identifiers;
adding the particular candidate device identifier corresponding to the controlled device to a set of active devices;
receiving an audio signal comprising an audible command;
identifying a particular active device of the set of active devices based at least in part on the audible command; and
transmitting, to the particular active device, a subsequent IR command signal pattern to command the particular active device to execute an action corresponding to the audible command.

15. The one or more computer-readable storage media of claim 14, wherein the digital fingerprint of a candidate device is obtained from the candidate device.

16. The one or more computer-readable storage media of claim 14, further comprising instructions for prompting a user to execute an subsequent action at the device controller corresponding to the IR command signal pattern.

17. The one or more computer-readable storage media of claim 14, wherein identifying the particular active device is further based at least in part on utilizing an audio comparison algorithm.

18. The one or more computer-readable storage media of claim 14, further comprising instructions for obtaining at least one of a temporal pattern or usage patterns of the set of active devices, wherein identifying the particular active device is further based at least in part on the temporal pattern or usage pattern.

19. The one or more computer-readable storage media of claim 14, further comprising instructions for:
identifying an additional active device from the set of active devices based at least in part on a subsequent command; and
transmitting, to the additional active device, an additional IR command signal pattern corresponding to the subsequent command.

20. The one or more computer-readable storage media of claim 14, further comprising instructions for identifying a first location at which the command was initiated and locations associated with each of the set of active devices, wherein identifying the particular active device is further based at least in part on the first location at which the command was initiated and the locations associated with each of the set of active devices.

* * * * *